(No Model.)

M. S. CABELL.
RELIEF AND GAGE COCK.

No. 304,610. Patented Sept. 2, 1884.

Witnesses
Wm. A. Rosenbaum
Wm. M. Stockbridge.

Inventor:
Milton S. Cabell
by N. D. Stockbridge
Atty.

UNITED STATES PATENT OFFICE.

MILTON S. CABELL, OF QUINCY, ILLINOIS.

RELIEF AND GAGE COCK.

SPECIFICATION forming part of Letters Patent No. 304,610, dated September 2, 1884.

Application filed May 1, 1884. (No model.)

*To all whom it may concern:*

Be it known that I, MILTON S. CABELL, a citizen of the United States, residing at Quincy, in the county of Adams and State of Illinois, have invented certain new and useful Improvements in Relief and Gage Cocks, of which the following is a full specification.

My invention relates to exterior relief-valves, and has for its objects to provide an automatic relief for the condensation of steam in an engine-cylinder; to provide a means whereby the said valve may be kept in an open position regardless of steam pressure or velocity; to provide a means of overcoming the difficulty encountered by scales or other foreign matter getting on the valve-seat, and thereby preventing the valve properly fitting thereon, and causing leakage; and, also, to provide a relief-valve for cylinders that may also be used as a gage or try cock for steam-boilers. These several objects are accomplished in the device illustrated in the annexed drawings, reference being made to them in the following description, and in which—

Figure 1:
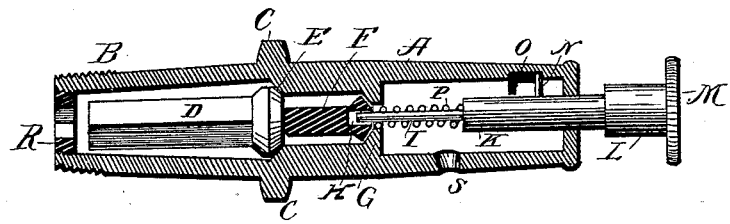
Figure 2:
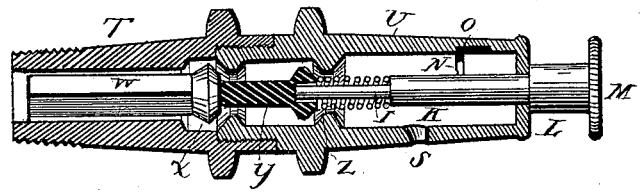

Figure 1 represents a longitudinal section through the valve, the casing being made in one piece; and Fig. 2 is a similar view, in which the shell is made of two pieces screwed together.

A represents the shell, provided at one end, B, with a screw-thread for securing in a cylinder or in a boiler. About midway on the exterior of the said shell is raised a flange, C, so constructed as to form a nut-head for the reception of a wrench in screwing the device in place.

In Fig. 1 the screw-threaded end of the shell is left open for the insertion of the valves, the larger one, D, having a seat, E, on the inner part of the shell, about coincident with the flange C, aforementioned. Adapted to normally rest against the head of the valve D is a smaller one, F, also having a proper seat, G, which, together with seat E, is formed integral with the shell. In the head of the smaller valve, F, is a cylindrical recess, H, adapted to receive the end of the spring-encircled rod or bar I. This bar I forms an extension of the larger bar or rod K, which passes through the closed end of the shell, and is there enlarged at L, as shown. The end of the enlargement L is provided with a screw-head, M, the outer flat surface of which is a pressure-point for the push-bar. From the enlargement K of the bar projects the pin N, adapted to engage in the L-shaped slot O in the shell. This slot allows the push-bar, which is kept normally in the position shown in Fig. 1, to be pushed inward, and by being slightly turned to be locked in the position shown in Fig. 2. The spring P presses at one end against the enlarged rod K, and at the other against the head of the valve F. After the insertion of the valves the open end of the shell is closed by a nut or washer, R, screwed therein, the said nut having a prismatic opening for facilitating its removal, and for the admission of water or steam to the exhaust-valve. The shell is also provided with an outlet, S, beyond or outside the valve.

In Fig. 2 the shell is made of two pieces, T and U, respectively, as shown, each being provided with a flange or nut head. The shell has an external screw-thread for its proper insertion into the cylinder or boiler. The seat of valve W is formed by an internal annular shoulder on the open end of the part U of the shell. The valve Y is similar in construction to F in Fig. 1, except that the construction allows the use of a larger head. The valve has a proper seating, Z, and receives and is operated by the push-bar, the same as the valve F in Fig. 1.

It is evident that when there is no steam-pressure the spring will normally keep the valve open; but as soon as steam is let on and the pressure and velocity become great enough to overcome the force of the spring, the valve D or W will close, the valve F or Y, having slightly longer play, remaining somewhat open. Such a position is shown in Fig. 1, in which it is assumed a steam-pressure is being exerted. It will also be seen that should a scale or the like get on the valve-seat of the larger valve, thus allowing a passage of the steam beyond, the pressure would quickly become great enough to close the smaller valve, thus effectually preventing all leakage. Before the pressure is great enough to close either valve any condensed steam that may be in the cylinder will be forced out and pass through the orifice or vent S, thus obviating the danger of "knocking out" the cylinder-head or otherwise damaging the engine. Before starting an engine that has been at rest long enough for the cylinders to cool, to prevent danger attending a rapid condensation of steam, the push-bars are forced in and "locked" in the manner described, thus holding the valve open and allowing the condensation to freely escape until the parts are thoroughly heated, after which the valves may be unlocked and allowed to operate automatically, as described.

The valve is of such construction that it may be readily attached to a boiler to act as a water or gage cock. The normal boiler or cylinder pressure will keep the valve closed. Forcing the push-bars inward will open the valves and allow the water or steam to escape, thus showing the condition of the boiler.

Having described the device, what I claim, and desire to secure by Letters Patent, is—

1. The double automatic relief-cock herein described, consisting of two valves seating separately in the same direction, having an interposed stem, so that both are opened by the operation of a single spring, as shown and described.

2. A double convertible gage and relief cock, consisting of the combination of two valves seating separately in the same direction, an interposed stem, and a push-bar, substantially as specified.

3. A relief-cock consisting of the combination of two valves seating in the same direction, and means for forcing and locking them open, substantially as described.

4. An automatic relief-cock having its valve or valves opened at pleasure by a suitable push-bar, and constructed to be used as a cylinder relief or gage cock on a boiler, substantially as specified.

5. An automatic relief-cock having two valves, one closed by steam-pressure, and the other held slightly open by a spring, substantially as and for the purpose specified.

6. The combination, with a shell or case formed of one or more pieces, properly shouldered and screw-threaded for insertion in a cylinder or boiler, and having internal valve-seats, of the two valves adapted to the internal construction, and one being recessed, and the push-bar having at one end a spring, and having on it a projecting pin adapted to engage in an L-slot in the casing, all operating substantially as and for the purpose specified.

In testimony that I claim the foregoing I hereunto affix my signature in the presence of two witnesses.

MILTON S. CABELL.

Witnesses:
WM. A. ROSENBAUM,
M. P. CALLAN.